United States Patent
Newberth, III et al.

(10) Patent No.: US 6,761,775 B1
(45) Date of Patent: Jul. 13, 2004

(54) RINSEWATER SEPARABLE AND RECYCLABLE ANAEROBIC CURING IMPREGNATION COMPOSITIONS

(75) Inventors: Frederick F. Newberth, III, West Hartford, CT (US); Charles M. Muisener, Newington, CT (US); Stephen W. Ernst, Middlefield, CT (US)

(73) Assignee: Henkel Corporation, Rocky Hill, CT (US)

( * ) Notice: Subject to any disclaimer, the term of this patent is extended or adjusted under 35 U.S.C. 154(b) by 159 days.

(21) Appl. No.: 09/929,618

(22) Filed: Aug. 14, 2001

(51) Int. Cl.$^7$ ................................................. C23G 1/36
(52) U.S. Cl. ................. 134/10; 134/2; 134/4; 134/22.1; 134/23.1; 134/104.4; 134/109; 210/719; 210/724; 210/725; 210/726; 210/727; 521/40
(58) Field of Search ............. 134/10, 2, 4, 22.1, 134/25.1, 104.6, 104.4, 109; 210/719, 724, 725, 726, 727; 521/40

(56) References Cited

U.S. PATENT DOCUMENTS

| | | |
|---|---|---|
| 3,672,942 A | 6/1972 | Neumann et al. |
| 3,969,552 A | 7/1976 | Malofsky et al. |
| 4,147,821 A | 4/1979 | Young |
| 4,416,921 A | 11/1983 | Dunn |
| RE32,240 E | 9/1986 | DeMarco |
| 4,632,945 A | 12/1986 | Garcia et al. |
| 5,006,233 A | 4/1991 | Muisener |
| 5,135,663 A | 8/1992 | Newberth, III et al. |
| 5,149,441 A | 9/1992 | Welch, II et al. |
| 5,273,662 A | 12/1993 | Muisener et al. |
| 5,433,860 A | 7/1995 | Yasuda |
| 5,518,632 A | 5/1996 | Juday |

FOREIGN PATENT DOCUMENTS

| | | | |
|---|---|---|---|
| EP | 0 639 531 A1 | 2/1995 | ............ C02F/1/44 |
| GB | 1308947 | 3/1973 | |
| GB | 1547801 | 6/1979 | |

Primary Examiner—Randy Gulakowski
Assistant Examiner—Gentle E. Winter
(74) Attorney, Agent, or Firm—Steven C. Bauman

(57) ABSTRACT

The present invention relates to anaerobic curing impregnation sealant compositions which are readily separable from water upon mixing.

14 Claims, No Drawings

RINSEWATER SEPARABLE AND RECYCLABLE ANAEROBIC CURING IMPREGNATION COMPOSITIONS

BACKGROUND OF THE INVENTION

1. Field of the Invention

The present invention relates to anaerobic curing impregnation sealant compositions, which are readily separable from water. More particularly the present invention relates to anaerobic curing impregnation sealant compositions which have a density. sufficiently different from water to allow facile separation therefrom.

2. Brief Description of Related Technology

Inpregnation sealing of porosity in porous parts frequently is carried out by introducing sealant compositions into the porosity under a pressure differential, by vacuum techniques which are well known in the art.

Sealant compositions typically employed in these impregnation applications include a wide variety of self curing anaerobic sealants, e g. the compositions described in U.S. Pat. Nos. 3,672,942 (Neumann); 3,969,552 (Malofsky); Re. 32,240 (DeMarco); and 4,632,945, which are curable through free radical polymerization in the presence of suitable free radical initiators, e.g., peroxy type initiators, as well as thermal curing sealants, e.g., the compositions described in U.S. Pat. Nos. 4,416,921 (Dunn) and 4,147,821 (Young), as well as sealants which cure by both anaerobic and heat cure mechanisms.

Impregnation sealant compositions are typically impregnated into the porosity of porous parts by vacuum and pressure techniques. A vacuum removes air from the porosity of the metal parts. Sealant compositions are then introduced into the porosity under a pressure differential using ambient pressure or elevated pressure conditions. After impregnation, an operation, such as a centrifuge operation, removes excess surface sealant from the metal part. Even after removing gross surface accumulations of the sealant, a significant amount of sealant remains on the surface of the porous parts, particularly in the vicinity of the pores. When the sealant is an anaerobically curable one, the surface accumulations as well as the outermost layer of the sealant in the pores of the parts, particularly shallow surface pores, contact oxygen, so that surface quantities of the impregnate remains uncured or only partially cured.

Remaining surface sealant or sealant trapped in blind holes of the impregnated parts is typically removed in an agitated water rinse zone. The impregnated and water rinsed parts may be transferred to an activator zone in which the impregnated parts are contacted with a catalyst activator solution (in the case of anaerobic sealants curing) or passed to a tank containing hot water, e.g., at a temperature of 90° C. to 150° C. (in the case of heat curing sealants) to effect curing of the sealant material at the entrance to the pores in the parts. Thereafter, the impregnated parts may be transferred to a fial rinse zone for removal of the activator solution from the impregnated parts.

A variation of this impregnation system uses a heat-curing resin in place of the anaerobically-curing resin, whereby the activating and final rinsing steps previously described are eliminated in favor of a hot rinse final step. In the heat-curing resin impregnation system, after impregnation and rinsing of excess surface material, the parts are contacted with hot water at temperatures on the order of about 50° C. to about 90° C. to cure the impregnation resin. See U.S. Pat. Nos. 4,416,921 (Dunn) and 4,147,821 (Young).

Whether the resin is heat curing or anaerobic curing, the problem of excess resin in the rinse water exists. In the past, the problem has been dealt with through wastewater treatment process or systems. See U.S. Pat. Nos. 5,006,233 (Muisener), 5,135,663 (Newberth, III), 5,149,441 (Welch, II), 5,273,662 (Muisener) and 5,433,860 (Yosuda). The problem has been addressed through emulsifying the resin in the rinsewater for subsequent treatment. See e.g., U.S. Pat. Nos. 4,416,921 (Dunn) (heat-curing sealant composition which contains a polymerizable acrylic monomer, an azonitrile and an anionic or nonionic surfactant to render the composition self-emulsifying upon mixing with water) and 4,147,821 (Young) (heat-curing sealant composition which contains (meth)acrylic monomer, a polyfunctional acrylic monomer, and an emulsifier, aid in the rinsing of uncured sealant from the surface of a porous article).

In these impregnation compositions and systems, either organic solvents or specific surfactants are used to remove uncured sealant in a reasonable rinse time and/or specific multi-component sealant compositions are used to avoid excessive rinse times. While the '921 patent and the '821 patent discuss emulsifying the rinsewater-resin mixture, so doing does not render facile physical separation of uncured excess resin from the rinsewater.

Another approach to solving the problem of excess resin in the rinse water is disclosed by U.S. Pat. No. 5,518,632, which increases the specific gravity of the rinse water through the addition of a salt, which allegedly causes excess resin which is less dense to float to the top. This approach is limited to directly treating the water, as opposed to providing resin composition which addresses the problem.

Accordingly, it would be desirable to provide an impregnation sealant composition that could be readily separable from rinsewater in its uncured state.

SUMMARY OF THE INVENTION

The present invention relates generally to rinse water treatable impregnation sealant compositions. These compositions are free-radical curable, and upon mixing with water are separable therefrom. The compositions include (a) a (meth)acrylate component and (b) a free radical initiator, where the (meth)acrylate component has a density sufficiently different from that of water, thereby allowing for facile separation therefrom when mixed In a particularly desirable aspect of the invention, the (meth)acrylate component has a density that is greater than water, thereby allowing for the (meth)acrylate component to separate from the rinsewater and collect as a lower portion of the flowable contents of a rinsewater tank.

The present invention provides compositions for sealing porous parts which have improved water separability, thereby permitting improved rinse water treatability and reduced rinsing requirements. Instead of requiring emulsification with the rinse water, the compositions of the present invention separate from the rinse water due to differences in density. Indeed, having a density sufficiently different from that of water, such as greater than water, allows for excess resin to settle to the lower portion of the rinse tank. This allows the resin to be drained off from the rinse tank, leaving rinse water with the tank, or decanting of the rinsewater away so as to allow removal of the excess resin from the lower portion of the rinse tank. The compositions of the present invention easily separate from the rinse water.

In particular, the present invention provides an impregnation sealant composition with improved water separability, thereby reducing the rinse cycle duration, and which improves surface cleanliness of the porous article by more readily separating the uncured impregnation sealant composition from the rinsewater and hence from the formerly porous article.

The present invention further provides a composition including as its curable component a (meth)acrylate composition which desirably has a density greater than water, thereby allowing for the (meth)acrylate component to separate from the rinsewater and collect as a lower portion of the flowable contents of a rinsewater tank.

In another aspect of the invention there is provided a method of separating uncured or excess resin from an impregnation rinsewater tank which method includes providing a curable composition having a (meth)acrylate component, the (meth)acrylate component having a density which is sufficiently different than water so as to allow separation of the curable composition from the rinsewater. Desirably the density of the (meth)acrylate component is sufficiently greater than that of water to permit phase separation, whereby the resin portion of the composition settles to the lower portion of the rinse tank and is easily removed, leaving the rinsewater behind for potential future use.

In another aspect of the invention there is provided a method of preparing a curable impregnation composition which separates into a substantially separate layer in the presence of water which includes combining a (meth)acrylate component and a free radical initiator component, whereby the (meth)acrylate constituents together having a density sufficiently greater or less than water to permit separation when combined with water.

In another aspect of the invention there is included a composition which contains a combination of monomers in which one or more monomers may be soluble in water, as well as at least partially soluble in another substantially insoluble monomer present. In such a case, that portion of the water soluble monomer which dissolves in the water insoluble monomer will be carried along with the water insoluble monomer as it separates from the water, i.e., sinks to the bottom due to a density greater than water, or floats to the water surface due to a lesser density than water. Thus, even substantially water soluble monomers, which would not otherwise be easily separated from water, can be separated and removed from water to the extent that they are solubilized in the water-insoluble monomer by the present invention in this matter.

Surfactants may optionally be added to further enhance the properties of the present inventive compositions and facilitate separation of monomer components from water.

The present invention will be more thoroughly understood after a reading of the section of the application entitled, "Detailed Description of the Invention".

DETAILED DESCRIPTION OF THE INVENTION

The present invention relates generally to rinse water treatable impregnation sealant compositions. These compositions are free-radical curable, and upon mixing with water are separable therefrom. The compositions include (a) a (meth)acrylate component and (b) a free radical initiator, where the (meth)acrylate component has a density significantly different from that of water, thereby allowing for facile separation therefrom when mixed.

The present invention provides compositions for sealing porous parts which have improved water separability, thereby permitting improved rinse water treatability and reduced rinsing requirements.

The invention impregnation sealant compositions use a (meth)acrylate component whose density is sufficiently different from that of water such that upon mixing with water, the compositions are readily or self-separable therefrom.

In one aspect of the invention, the compositions include a (meth)acrylate component whose constituents together render the component having a density greater than that of water. For instance, tetrahydrofurfuryl (meth)acrylate (1.041), 2-phenoxyethyl (meth)acrylate (1.079), triethyleneglycol di(meth)acrylate (1.070), PEG600 di(meth)acrylate (1.101), EBIPMA (1.122) each have a density greater than 1 (the density of water). In addition, Monofunctional Monomers: Tetrahydrofurfuryl Methacrylate (1.041), 2-Phenoxyethyl Methacrylate (1.079), Glycidyl Methacrylate (1.073), Methoxy Polyethylene Glycol (350) Monomethacrylate (1.0721), Polypropylene Glycol Monomethacrylate (1.011), Methoxy Ethyl Acrylate (1.012) and Benzyl Methacrylate (1.04). Difunctional Monomers: Triethylene Glycol Dimethacrylate (1.070), Ethylene Glycol Dimethacrylate (1.049), Polyethylene Glycol Dimethacrylate (1.080), 1,4-Butanediol Diacrylate (1.054), 1,4-Butanediol Dimethacrylate (1.019), Diethylene Glycol Dimethacrylate (1.061), Polyethylene Glycol (600) Dimethacrylate (1.101), Ethoxylated Bisphenol A Dimethacrylate (1.119), Ethoxylated$_{10}$ Bisphenol Dimethacrylate (1.131), Ethoxylated Bisphenol A Dimethacrylate, (1.1160, Polyethylene Glycol (400) and Dimethacrylate (1.117). Trifunctional Monomers: Trimethylolpropane Trimethacrylate (1.061), Trimethylolpropane Triacrylate (1.109), Tris (2-hydroxy Ethyl) Isocyanurate triacrylate (1.300), Tris (2-Hydroxy Ethyl Isocyanurate Triacrylate (1.158), Ethoxylated$_{20}$ Trimethylolpropane Triacrylate (1.115), Pentaerythritol Triacrylate (1.162), Ethoxylate$_3$, Trimethylolpropane Triacrylate (1.103), Propoxylated$_3$ Trimethylolpropane Triacrylate (1.050), Ethoxylated$_6$ Trimethylolpropane Triacrylate (1.107), Propoxylated$_6$ Trimethylolpropane Triacrylate (1.048) and Propoxylated$_3$ Glyceryl Triacrylate (1.089). Tetra & Pentafunctional Monomers: Di-Trimethylolpropane Tetraacrylate (1.010). Water Dispersible Monomers: Polyethylene Glycol (600) Dimethacrylate (1.101), 2(2-Ethoxyethoxy) Ethylacrylate (1.013), Polyethylene Glycol (200) Diacrylate (1.122), Polyethylene Glycol (400) Diacrylate (1.117), Ethoxylated20 Trimethylolpropane triacryalte (1.115), Methoxy Polyethylene Glycol (350) Monomethacrylate (1.0721), Methoxy Polyethylene Glycol (550) Monomethacrylate (1.0871), Polyethylene Glycol (400) Dimethacrylate (1.117), polypropylene Glycol Monomethacrylate (1.011), Polyethylene Glycol (600) Diacrylate (1.117), Metallic Diacrylate (1.677) and Metallic Dimethacrylate (1.485). Saret® Metallic Coagents: SR 633 Modified Metallic Diacrylate (1.594), SR 634 Modified Metallic Diacrylate (1.481), SR 639 Metallic Diacrylate (1.442), SR 638 Metallic, Diacrylate (1.528), SR 705 Metallic Diacrylate (1.677), SR 706 Modified Metallic Diacrylate (1.604), SR 708 Metallic Dimethacrylate (1.485) and SR 709 Metallic Monomethacrylate (1.880). Multifunctional Monomers: Trimethylolpropane Trimethacrylate (1.06). Specialty monomers: Dimethylaminoethyl Acrylate DMS Quaternary (1.18), and combinations thereof.

In another aspect of the invention, the compositions include a (meth)acrylate component whose constituents together have a density less than 1.0, i.e. less than that of water. For instance, 1,6-hexanediol dimethacrylate (0.982) and lauryl methacrylate (0.872) are among those useful. In this aspect of the invention, the composition in the rinse water will float to the top of the rinse water.

Examples of other monomers which have densities less than 1.0 include: ethyl methacrylate (0.912); allyl methacrylate (0.930); isodecyl methacrylate (0.878); stearyl acrylate (0.864); stearyl methacrylate (0.866); lauryl acrylate (0.875); isodecylacrylate (0.861); isobornyl methacrylate (0.979); isoctyl acrylate (0.880); tridecyl acrylate (0.861); tridecyl methacrylate (0.880; isobornyl acrylate (0.987); propoxylated allyl methyacrylate (0.958); n-butyl methacrylate (0.896); isobutyl methacrylate (0.888); cyclohexyl methacrylate (0.968); n-hexyl methacrylate (0.885); methyl methacrylate (0.943); and combinations thereof.

The polymerizable composition includes polyfunctional and monofunctional (meth)acrylate esters to effectuate the polymerizable properties of the sealant. The inventive sealant compositions may contain other components to tailor the polymerizing, curing or emulsifying properties of the compositions. The inventive sealants also contain an initiator system and/or inhibitor systems to provide controlled anaerobic or thermal curing mechanisms. These compositions have a variety of uses, including an impregnation compositions, sealants, adhesives, coatings and the like. One particularly desirable embodiment relates to impregnation sealant compositions for porous parts.

The inventive compositions are generally curable by free-radical mechanisms. Typically, anaerobic conditions or elevated temperature condition may be used.

The inventive compositions may contain from about 50% to about 99% (meth)acrylate component by weight of the total composition with the balance including other materials, for instance, initiators, inhibitors, surfactants, non-reactive plasticizers, and the like.

Furthermore, in still another embodiment the inventive sealant composition may include at least one crosslinkable (meth)acrylate component having a density sufficiently different than water to facilitate separation from rinsewater, and a curing component for said (meth)acrylate component. Desirably, the polymerizable component has a majority of polyfunctional (meth)acrylate esters (hereinafter, poly (meth)acrylate esters). These polyfunctional esters produce cross-linked polymers, which serve as effective and durable sealants, adhesives and coatings.

While various (meth)acrylate esters may be used, desirable poly(meth)acrylate esters include those with the following general formula:

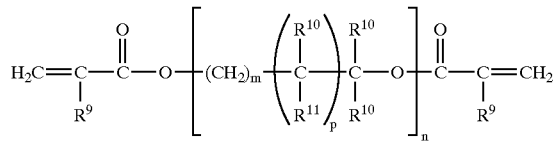

wherein $R^{10}$ represents a radical selected from the group consisting of hydrogen, lower alkyl of from 1 to about 4 carbon atoms, hydroxyalkyl of from 1 to about 4 carbon atoms and;

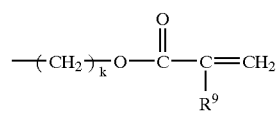

$R^9$ is a radical selected from the group consisting of hydrogen, halogen, and lower alkyl of from 1 to about 4 carbon atoms; $R^{11}$ is a radical selected from the group consisting of hydrogen, hydroxyl, and

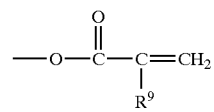

and m may be 0 to 12, and desirably from 0 to about 6; n is equal to at least 1, e.g., 1 to about 20 or more, and desirably between about 2 to about 6; k is 1 to about 4; and p is 0 or 1.

Combinations and derivatives of these polyfunctional materials are contemplated.

Monofunctional (meth)acrylate esters (esters containing one (meth)acrylate group) are also advantageously used in the present compositions. The most common of these monofunctional esters include the alkyl esters such as lauryl methacrylate. Many of the lower molecular weight alkyl esters are quite volatile, and frequently it is more desirable to use a higher molecular weight homolog, such as decyl methacrylate or dodecyl methacrylate, or any other fatty acid acrylate esters, in (meth)acrylate based impregnate compositions.

When monofunctional (meth)acrylate esters are employed in the present compositions, it is desirable to use an ester which has a relatively polar alcohol moiety. Such materials are less volatile than low molecular weight alkyl esters and, in addition, the polar group tends to provide intermolecular attraction in the cured polymer, thus producing a more durable seal. Desirably the polar group is selected from the group consisting of labile hydrogen, heterocyclic ring, hydroxyl, amino, cyano, and halogen polar groups. Typical examples of compounds within this category are cyclohexylmethacrylate, tetrahydrofurfuryl methacrylate, hydroxyethyl acrylate (HEMA), hydroxypropyl methacrylate (HPMA), t-butylaminoethyl methacrylate, cyanoethylacrylate, chloroethylmethacrylate. Combinations of monofunctional (meth)acrylate are contemplated.

When poly(meth)acrylate esters and monofunctional (meth)acrylate esters are employed together in the present compositions, the ratio of poly(meth)acrylate esters to monofunctional (meth)acrylate esters on a weight basis is generally about 0.05:1 to about 20:1. Desirably, for use in impregnation compositions the ratio is about 5:1.

The compositions of the present invention may be anaerobically curable through a free radical mechanism, with an initiator being present therein, or an initiator system comprising a redox polymerization initiator (i.e., an ingredient or a combination of ingredients which produce an oxidation reduction reaction, resulting in the production of free radicals). Suitable initiators include peroxy materials e.g., peroxides, hydroperoxides, and peresters, which are capable of inducing polymerization of the inventive compositions in the substantial absence of oxygen, and yet not induce polymerization as long as oxygen is present. Organic hydroperoxides are the desirable peroxy materials with t-butyl hydroperoxide and cumene hydroperoxide being particularly useful with the inventive compositions.

In addition to initiator components, the composition of the present invention may include various initiator accelerators, as for example hydroperoxide decomposition accelerators, when hydroperoxides are used as cure initiators in the sealant material. Typical examples of potentially suitable accelerators include: tertiary amines such as tributyl amine; sulfimides such as benzoic sulfimide (or saccharin); formamide; and compounds containing transition metals, such as copper octanoate.

The inventive compositions may also be heat curable compositions through a free radical mechanism, with a heat cure initiator being present, or an initiator system comprising a redox polymerization initiator (i.e., an ingredient or a combination of ingredients which at the desired elevated temperature conditions, e.g., from about 90° to about 150° C., produce an oxidation reduction reaction, resulting in the production of free radicals). Suitable initiators may include peroxy materials, e.g., peroxides, hydroperoxides, and peresters, which under appropriate elevated temperature conditions decompose to form peroxy free radicals which are initiatingly effective for the polymerization of the inventive compositions.

Another useful class of heat curing initiators comprises azonitrile compounds which yield free radicals when decomposed by heat. Heat is applied to cure the composition, and the resulting free radicals initiate polymerization of the inventive composition.

For example, azonitrile may be a compound of the formula:

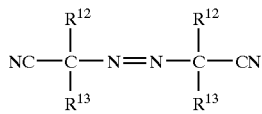

wherein $R^{12}$ is a methyl, ethyl, n-propyl, iso-propyl, iso-butyl or n-pentyl radical, and $R^{13}$ is a methyl, ethyl, n-propyl, iso-propyl, cyclopropyl, carboxy-n-propyl, iso-butyl, cyclobutyl, n-pentyl, neo-pentyl, cyclopentyl, cyclohexyl, phenyl, benzyl, p-chlorbenzyl, or p-nitrobenzyl radical or $R^{12}$ and $R^{13}$, taken together with the carbon atom to which they are attached, represent a radical of the formula,

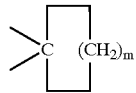

wherein m is an integer from 3 to 9, or the radical

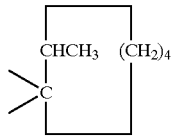

Compounds of the above formula are more fully described in U.S. Pat. No. 4,416,921, the disclosure of which hereby is incorporated herein by reference.

Azonitrile initiators of the above described formula are readily commercially available, e.g., the initiators which are commercially available under the trademark VAZO® from E. I. DuPont de Nemours and Company, Inc. (Wilmington, Del.), including VAZO® 52 ($R^{12}$=methyl, $R^{13}$=isobutyl), VAZO® 64 ($R^{12}$=methyl, $R^{13}$=methyl), and VAZO® 67 ($R^{12}$=methyl, $R^{13}$=ethyl), all such $R^{12}$ and $R^{13}$ constituents being identified with reference to the above described azonitrile general formula.

A desirable azonitrile initiator is 2,2'azobis (isobutyronitrile) or AZBN.

The azonitrile may be employed in the inventive heat curable compositions in concentrations on the order of about 500 to about 10,000 parts per million (ppm) by weight, desirably about 1000 to about 5000 ppm.

Other (meth)acrylic monomer based impregnate compositions of a heat curable character may be employed in the broad practice of the present invention, including those disclosed in UK Patent Specifications 1,308,947 and 1,547,801. As described in these references, the monomeric impregnate composition may contain suitable inhibitors serving to restrict or preclude the occurrence of polymerization of the monomer, at temperatures below those desired or recommended for heat curing of the impregnate composition.

The inventive impregnate compositions may also contain other constituents, such as: other comonomer species, reactive diluents, pigments, surfactants, fillers, polymerization inhibitors, stabilizers, antioxidants, anticorrosion additives, and the like. For example, surfactants may be combined with the inventive compositions or included in the aqueous rinse solution. The use of surfactants and specific materials utilized for such purpose are more fully described in U.S. Pat. No. 3,969,552 and Re. 32,240, the disclosures of each of which are expressly incorporated herein by reference. Suitable surfactants include classes of anionic surfactants, such as petroleum sulfanates, alkyl sulfanates or alkylaryl sulfanates; and nonionic surfactants, such as, ethoxylated alkyl phenols, ethoxylated linear secondary alcohols, polyoxyethylene or polyoxypropylene glycols.

The present invention provides the end user with the ability to reuse at least a portion of the uncured impregnation sealant composition, and/or treat the impregnation part with little water or sealant composition wasted.

The invention may be further understood with reference to the following non-limiting examples.

EXAMPLES

Example 1

The following inventive anaerobic Composition A was prepared in accordance with the present invention as an example of a composition having a density greater than water such that it separates itself into a distinct layer at the bottom of the rinsewater tank subsequent to mixing in the rinse cycle of an impregnation process.

COMPOSITION A

| Component | Density | Wt % |
|---|---|---|
| 1,4-butanediol dimethacrylate | 1.025 | 52.59 |
| 1,3-glycerol dimethacrylate | 1.12 | 7.00 |
| Triallyl isocyanurate | 1.1 | 10.00 |
| Methyl triglycol methacrylate | 1.02 | 25.00 |
| Bismaleimide BMI-70 | Solid | 2.00 |
| Tergitol 15-S-9 (surfactant) | 1.006 | 2.50 |
| Fluorescence |  | 0.02 |
| Chelator/inhibitor |  | 0.04 |
| saccharin |  | 0.30 |
| t-butyl hydroperoxide |  | 0.55 |
| Total |  | 100.00 |

Porous powdered iron parts were subjected to a conventional dry vacuum impregnation process using inventive Composition A. Subsequent to the rinse process, excess sealant settled to the bottom of the rinse tank in a distinct layer. This layer was easily siphoned off and recycled into a reservoir tank, leaving reusable rinsewater behind. The recycled impregnate demonstrated the ability to seal powdered metal parts with no leaks when tested at 60 psi using a testing apparatus as per Military Specification MIL-I-17563.

Example 2

The following inventive anaerobic Composition B was prepared in accordance with the present invention as an example of a composition having monomer components which have a density less than water (less than 1.0), such that the composition floats to the top of the rinsewater tank subsequent to mixing in the rinse cycle of an impregnation process. The presence of the surfactant in the composition provides enhanced washability, while the presence of the di(meth)acrylate provides crosslining.

In this example, a portion of the hydroxypropyl methacrylate (HPMA) is soluble both in water and the other water insoluble methacrylate components, i.e., lauryl methacrylate and 1,6-hexane diol di-methacrylate. That portion of the HPMA which dissolves in the other monomers also tends to be carried to the surface of the water and thus behaves more like the lower density water insoluble materials, notwithstanding the fact that HPMA has a density greater than water.

COMPOSITION B

| Component | Density | Wt % |
| --- | --- | --- |
| Lauryl methacrylate | 0.872 | 55.0 |
| Hydroxypropyl methacrylate | 1.03 | 35.0 |
| 1,6-hexane diol di(meth)acrylate | 0.982 | 6.0 |
| Surfactant | | 3.11 |
| Chelator/inhibitor | | 0.04 |
| saccharin | | 0.30 |
| t-butyl hydroperoxide | | 0.55 |
| Total | | 100.00 |

Porous powdered iron parts were subjected to a conventional wet vacuum impregnation process. The impregnation cycle was 10 minutes in wet vacuum/1 minute to come to atmospheric pressure/4 minutes soak at atmospheric pressure (10/1/4). Subsequent to the rinse process, excess sealant composition floated to the rinsewater surface, forming a separate layer above the water. This sealant layer was easily siphoned from the water and recycled into the impregnation reservoir tank for future use. The recycled impregnate demonstrated the ability to seal powdered metal parts with no leaks when tested at 60 psi using a testing apparatus as per Military Specification MIL-I-17563.

Example 3

The following inventive anaerobic Compositions C, D and E were prepared in accordance with the present invention as an example of compositions having monomer components which have a density less than water.

| | | Composition | | |
| --- | --- | --- | --- | --- |
| Component | Density | C | D | E |
| Lauryl methacrylate | 0.872 | 30 | 25 | 30 |
| 1,6-hexanediol di-methacrylate | 0.982 | 69.31 | 69.31 | 61.31 |
| Bismaleimide | — | — | — | 4.0 |
| Surfactant* | — | — | 5.0 | 4.0 |
| fluorescence | — | 0.2 | 0.02 | 0.02 |
| inhibitor | — | 0.04 | 0.04 | 0.04 |
| saccharin | — | 0.03 | 0.03 | 0.03 |
| t-butyl peroxide | — | 0.60 | 0.60 | 0.60 |

*Tergetol NP-9 (Union Carbide)

Each of these compositions were used to impregnate porous parts in accordance with Example 2. Subsequent to the rinse process, excess sealant composition floated to the top of the rinsewater to form a separate layer, which was easily removed and recycled for future use.

The invention being thus described, it will be clear to those persons of skill in the art that the same may be varied in many ways. Such variations are not to be regarded as a departure from the spirit and scope of the invention and all such modifications are intended to be included within the scope of the claims.

What is claimed is:

1. An anaerobic curable composition, which upon mixing with water is separable therefrom, comprising:
   (a) a (meth)acrylate component which has a density greater than that of water, wherein the (meth)acrylate component comprises one or more (meth)acrylate-containinq compounds; and
   (b) a free radical initiator, wherein the composition has a density greater than that of water, thereby self-separating therefrom when mixed without emulsification.

2. The composition of claim 1, wherein the free radical initiator includes an anaerobic-curing initiator to produce free radicals upon the exclusion of oxygen to cure the composition.

3. The composition of claim 2, wherein the anaerobic-curing initiator is a peroxy initiator selected from the group consisting of hydroperoxides, peroxides, peresters and combinations thereof.

4. The composition of claim 1, further comprising an anaerobic accelerator selected from the group consisting of tributyl amine, benzoic sulfimide, formamide, copper octanoate and combinations thereof.

5. The composition of claim 1, wherein said (meth)acrylate component is a member selected from the group consisting of a poly(meth)acrylate ester having the formula:

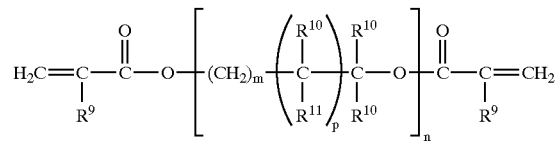

wherein $R^{10}$ represents a radical selected from the group consisting of hydrogen, lower alkyl of from 1 to about 4 carbon atoms, hydroxyalkyl of from 1 to about 4 carbon atoms and

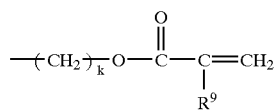

$R^9$ is a radical selected from the group consisting of hydrogen, halogen, and lower alkyl of from 1 to about 4 carbon atoms; $R^{11}$ is a radical selected from the group consisting of hydrogen, hydroxyl and

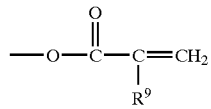

m is 0 to about 12, n is equal to at least 1, k is 1 to about 4 and p is 0 or 1.

6. The composition of claim 1, further including a monofunctional acrylate ester, said monofunctional acrylate ester being selected from the group consisting of lauryl methacrylate, cyclohexylmetharylate, tetrahydrofurfuryl methacrylate, hydroxyethyl acrylate, hydroxypropyl methacrylate, t-butylaminoethyl methacrylate, cyanoethylacrylate, chloroethylmethacrylate and combinations thereof.

7. A method of separating uncured impregnation sealant compositions from water-based impregnation rinsewater, comprising the steps of:
  (a) providing a porous article whose pores have been impregnably sealed by a curable composition which upon mixing with water is separable therefrom, said composition comprising;
    (i) a (meth)acrylate component which has a density greater than that of water, wherein the (meth)acrylate component comprises one or more (meth)acrylate-containing compounds; and
    (ii) a free radical initiator, wherein the composition has a density sufficiently different from that of water, thereby allowing for facile separation therefrom when mixed;
  (b) water washing said article in a rinsewater tank; and
  (c) allowing the composition to self-separate from the rinsewater without emulsification.

8. An anaerobic curable composition, which upon mixing with water is separable therefrom, comprising:
  (a) a (meth)acrylate component which has a density less than that of water, wherein the (meth)acrylate component comprises one or more (meth)acrylate-containing compounds; and
  (b) a free radical initiator, wherein the composition has a density less than that of water, thereby self-separating therefrom when mixed without emulsification.

9. The composition of claim 8, wherein the free radical initiator includes an anaerobic-curing initiator to produce free radicals upon the exclusion of oxygen to cure the composition.

10. The composition of claim 9, wherein the anaerobic-curing initiator is a peroxy initiator selected from the group consisting of hydroperoxides, peroxides, peresters and combinations thereof.

11. The composition of claim 8, further comprising an anaerobic accelerator selected from the group consisting of tributyl amine, benzoic sulfimide, formamide, copper octanoate and combinations thereof.

12. The composition of claim 8, wherein said (meth)acrylate component is a member selected from the group consisting of a poly(meth)acrylate ester having the formula:

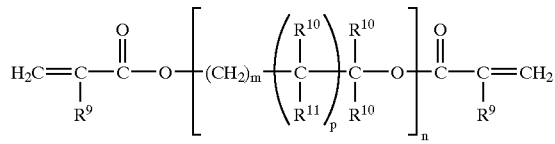

wherein $R^{10}$ represents a radical selected from the group consisting of hydrogen, lower alkyl of from 1 to about 4 carbon atoms, hydroxyalkyl of from 1 to about 4 carbon atoms and

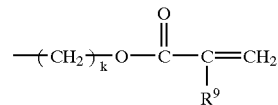

$R^9$ is a radical selected from the group consisting of hydrogen, halogen, and loweralkyl of from 1 to about 4 carbon atoms; $R^{11}$ is a radical selected from the group consisting of hydrogen, hydroxyl and

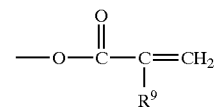

m is 0 to about 12, n is equal to at least 1, k is 1 to about 4 and p is 0 or 1.

13. The composition of claim 8, further including a monofunctional acrylate ester, said monofunctional acrylate ester being selected from the group consisting of lauryl methacrylate, cyclohexylmetharylate, tetrahydrofurfuryl methacrylate, hydroxyethyl acrylate, hydroxypropyl methacrylate, t-butylaminoethyl methacrylate, cyanoethylacrylate, chloroethylmethacrylate and combinations thereof.

14. A method of separating uncured impregnation sealant compositions from water-based impregnation rinsewater, comprising the steps of:
  (a) providing a porous article whose pores have been impregnably sealed by a curable composition which upon mixing with water is separable therefrom, said composition comprising;
    (i) a (meth)acrylate component which has a density less than that of water, wherein the (meth)acrylate component comprises one or more (meth)acrylate-containing compounds; and
    (ii) a free radical initiator, wherein the composition has a density sufficiently different from that of water, thereby allowing for facile separation therefrom when mixed;
  (b) water washing said article in a rinsewater tank; and
  (c) allowing the composition to self-separate from the rinsewater without emulsification.

* * * * *

UNITED STATES PATENT AND TRADEMARK OFFICE
CERTIFICATE OF CORRECTION

PATENT NO. : 6,761,775 B1
DATED : July 13, 2004
INVENTOR(S) : Frederick F. Newberth III et al.

It is certified that error appears in the above-identified patent and that said Letters Patent is hereby corrected as shown below:

Column 4,
Line 25, change "(1.1160, Polyethylene Glycol (400) and" to -- (1.116), Polyethylene Glycol (400) --
Line 28, change "Tris (2-Hydroxy Ethyl Isocyanurate" to -- Tris (2-Hydroxy Ethyl) Isocyanurate --
Line 30, delete the comma after "Ethoxylate$_3$."
Line 40, change "2(2-Ethoxyethoxy)" to -- 2-(2-Ethoxyethoxy) --.
Line 42, change "Ethoxylated20" to -- Ethoxylated$_{20}$ --.

Column 5,
Lines 3 and 5, change "isobomyl" to -- isobornyl --.

Column 11,
Line 2, change "cyclohexylmetharylate" to -- cyclohexylmethacrylate --.

Column 12,
Line 29, change "cyclohexylmetharylate" to -- cyclohexylmethacrylate --.

Signed and Sealed this

Twenty-first Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,761,775 B1
DATED : July 13, 2004
INVENTOR(S) : Newberth, III et al.

It is certified that error appears in the above-identified patent and that said Letters Patent is hereby corrected as shown below:

Column 1,
Line 57, should read -- ...transferred to a final rinse zone... --.

Column 2,
Line 45, should read -- ...separation therefrom when mixed. --.

Column 4,
Line 43, should read -- Trimethylolpropane triacrylate (1.115),... --.

Column 5,
Line 3, should read -- ...isobornyl methacrylate... --.
Line 5, should read -- ...isobornyl acrylate... --.
Lines 19-20, should read -- ...including impregnation compositions... --.

Column 8,
Line 4, should read -- ...contain suitable inhibitors... --.

Column 9,
Line 7, should read -- ...provides crosslinking... --.

Signed and Sealed this

Twenty-third Day of August, 2005

JON W. DUDAS
*Director of the United States Patent and Trademark Office*